Sept. 4, 1956  A. NIESS  2,761,438
PACKING FOR VALVES OF INTERNAL COMBUSTION ENGINES
Filed Oct. 8, 1953
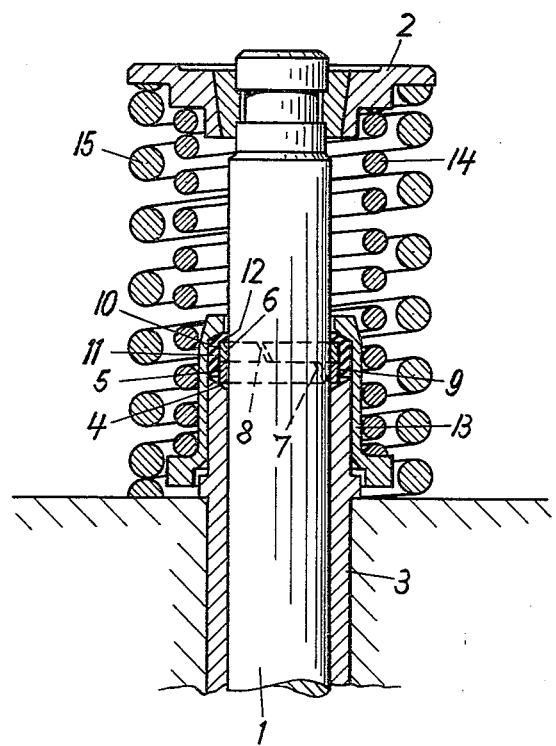
INVENTOR
ANTON NIESS
BY *Dicke and Craig*
ATTORNEYS.

United States Patent Office 2,761,438
Patented Sept. 4, 1956

2,761,438

PACKING FOR VALVES OF INTERNAL COMBUSTION ENGINES

Anton Niess, Stuttgart-Unterturkheim, Germany, assignor to Daimler-Benz Aktiengesellschaft, Stuttgart-Unterturkheim, Germany Application October 8, 1953, Serial No. 384,908

Claims priority, application Germany October 10, 1952

4 Claims. (Cl. 123—188)

The present invention relates to a packing for the valves of internal combustion engines. Such a packing is necessary lest lubricant may travel from the valve operating chamber along the valve stem into the intake port or the exhaust port, and vice versa to prevent the leakage of gas into the operating chamber.

An object of the present invention is to provide a packing which shows a long working life with a most constant efficiency in spite of the occurrence of high temperatures.

Another object of the present invention is, in using rubber-like rings, by which are meant non-metallic rings made from flexible material, and which, as to elasticity, possess rubber-like properties, particularly rubber itself, to arrange them so as to produce a sealing effect and so that they are protected against high temperatures, for instance, against as high as 100° C. or more, and against an excessive wearing by the valve stem.

According to a substantial feature of the present invention, metallic split rings similar to piston rings are provided between the valve stem and its guide by themselves or preferably in addition to a flexible ring. It is expedient to provide two rings arranged one after another because in the case of a single ring the lubricating oil may easily travel through the slot, whereas with two rings an efficient stop can be obtained by the slots being staggered opposite to each other.

The elastic ring is appropriately drawn over the two metallic split rings so as to seal the outer surfaces of these rings and simultaneously to press the rings radially inward against the valve stem so that a good sealing is also obtained thereat. Furthermore, the elastic ring can extend inwardly up to the valve stem, so that the ring also adds to the sealing effect thereat.

According to another feature of the present invention the tensioning of the elastic member in the axial direction may be brought about by a cap member or a cap nut. It is also possible to bring about this tensioning in the axial direction by the action of a spring producing an automatic readjusting.

Another possibility of radially tensioning a ring which snugly surrounds the valve guide consists in at the face of the valve guiding sleeve is designed as an internal conical surface so that a component directed inwardly and acting against the ring will be produced by tensioning the ring in an axial direction against this face.

Further objects, features and advantages of the present invention will become more obvious from the following description when taken in connection with the accompanying drawing which shows, for purposes of illustration only in the single view thereof, one embodiment of a construction in accordance with the present invention.

Referring now more particularly to the drawing, 1 illustrates a poppet valve of an internal combustion engine with the valve stem 1, the spring retainer 2, and the valve guide sleeve 3. The projecting face 4 of the valve guide sleeve is designed as an internal conical surface. Adjacent to this internal conical surface the two split rings 5 and 6 are arranged, the slots 7 and 8 of which are staggered about 180°. The rings 5 and 6 are pressed together and sealed at their outer surface 9 and 10 by the rubber ring 11 adding to the sealing effect by means of the collar-like portion 12 of reduced diameter. The cap sleeve 13 is pressed downwardly in the direction of the valve guide bushing 3 by the spring 14 acting as a second spring in addition to the main valve spring 15.

What I claim is:

1. A packing for poppet valves in internal combustion engines comprising a valve with a valve stem, a valve guide member for said valve stem, at least one metallic split ring between said valve guide member and said valve stem located at the end of said valve guide member opposite the poppet valve for sealing the gap between said valve stem and said valve guide member, a ring of rubber-like material surrounding said split ring, said ring of rubber-like material resting against said split ring with radial tensioning and forcing said split ring against said valve stem, said ring of rubber-like material being shaped conically at the end thereof opposite said valve guide member, a cap sleeve positioned over said end of the ring of rubber-like material and extending beyond the free end of said valve guide member, and means including a valve spring for spring-loading said cap sleeve to simultaneously press said split ring and said ring made of rubber-like material against the free end of said valve guide member and against said valve stem.

2. A packing according to claim 1 wherein said ring made of rubber-like material includes a collar-like part on the side of said split ring opposite the poppet valve which abuts against said valve stem.

3. A packing according to claim 2 further comprising two metallic split rings with the slots thereof displaced with respect to each other, said two metallic split rings lying adjacent said collar-like part on the side thereof towards said valve guide member.

4. A packing according to claim 1 wherein said valve guide member is provided with a wedge-like end surface, and wherein at least one of said rings rests against said wedge-like surface to be pressed thereby against said valve stem in sealing relationship therewith.

References Cited in the file of this patent

UNITED STATES PATENTS

| | | |
|---|---|---|
| 897,023 | Schaap | Aug. 25, 1908 |
| 1,594,517 | Dufty | Aug. 3, 1926 |
| 2,418,674 | Steiner | Apr. 8, 1947 |
| 2,466,428 | Hufferd et al. | Apr. 5, 1949 |

FOREIGN PATENTS

| | | |
|---|---|---|
| 196,653 | Great Britain | Apr. 23, 1923 |